(12) United States Patent
Koida

(10) Patent No.: US 9,671,586 B2
(45) Date of Patent: Jun. 6, 2017

(54) OPTICAL SYSTEM, OPTICAL APPARATUS AND METHOD FOR MANUFACTURING THE OPTICAL SYSTEM

(71) Applicant: NIKON CORPORATION, Chiyoda-ku, Tokyo (JP)

(72) Inventor: Keigo Koida, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/385,153

(22) PCT Filed: Feb. 20, 2013

(86) PCT No.: PCT/JP2013/000932
§ 371 (c)(1),
(2) Date: Sep. 13, 2014

(87) PCT Pub. No.: WO2013/136670
PCT Pub. Date: Sep. 19, 2013

(65) Prior Publication Data
US 2015/0098134 A1 Apr. 9, 2015

(30) Foreign Application Priority Data
Mar. 16, 2012 (JP) .................................. 2012-060985

(51) Int. Cl.
G02B 9/06 (2006.01)
G02B 13/18 (2006.01)
(Continued)

(52) U.S. Cl.
CPC ........... G02B 13/0045 (2013.01); G02B 9/64 (2013.01); G02B 13/04 (2013.01); G02B 13/22 (2013.01); Y10T 29/49826 (2015.01)

(58) Field of Classification Search
CPC .. G02B 13/18; G02B 13/0045; G02B 15/173; G02B 15/161; G02B 13/22;
(Continued)

(56) References Cited

U.S. PATENT DOCUMENTS 4,984,876 A 1/1991 Hata et al.
5,296,968 A 3/1994 Hata et al.
(Continued)

FOREIGN PATENT DOCUMENTS

JP 64-74518 A 3/1989
JP 64-79717 A 3/1989
(Continued)

Primary Examiner — Alicia M Harrington
(74) Attorney, Agent, or Firm — Shapiro, Gabor and Rosenberger, PLLC

(57) ABSTRACT

Provided is an optical system having, in order from an object, a positive first lens group (G1), an aperture stop (S) and a second lens group (G2), wherein the first lens group (G1) includes, in order from the object, a negative lens component (L1), a positive lens component (L2) and a first lens component (L3, L4), the image side surface of which is a concave surface facing the aperture stop (S), the second lens group (G2) includes, in order from the object, a second lens component (L5, L6), the object side surface of which is a concave surface facing the aperture stop (S), and a positive lens component (L8) disposed closest to the image, the first lens component (L1) and the second lens component (L2) face each other sandwiching the aperture stop (S), and the following conditional expressions (1) and (2) are satisfied: $1.5<fG1/f<2.6$ ... (1) and $2.1<TL/f<3.1$ ... (2), where fG1 denotes a focal length of the first lens group (G1), f denotes a focal length of the optical system (WL), and TL denotes a distance on the optical axis, from the optical surface closest to the object to the optical surface closest to the Image in the optical system (WL).

8 Claims, 9 Drawing Sheets

(51) Int. Cl.
*G02B 3/02* (2006.01)
*G02B 13/00* (2006.01)
*G02B 13/04* (2006.01)
*G02B 9/64* (2006.01)
*G02B 13/22* (2006.01)

(58) Field of Classification Search
CPC ...... G02B 23/2438; G02B 9/64; G02B 13/04;
Y10T 29/49826
USPC ........................................ 359/794, 717, 795
See application file for complete search history.

(56) References Cited

U.S. PATENT DOCUMENTS

| | | | |
|---|---|---|---|
| 5,390,048 | A | 2/1995 | Miyatake et al. |
| 5,539,579 | A | 7/1996 | Miyatake et al. |
| 2009/0225444 | A1 | 9/2009 | Yamamoto |
| 2010/0020420 | A1 | 1/2010 | Heu |
| 2011/0310496 | A1* | 12/2011 | Kubota .................... G02B 9/64 359/794 |

FOREIGN PATENT DOCUMENTS

| | | |
|---|---|---|
| JP | 5-0150158 A | 6/1993 |
| JP | 2009-210748 A | 9/2009 |
| JP | 2010-101979 A | 5/2010 |

\* cited by examiner (EXAMPLE 1)

(EXAMPLE 2)

(EXAMPLE 3)

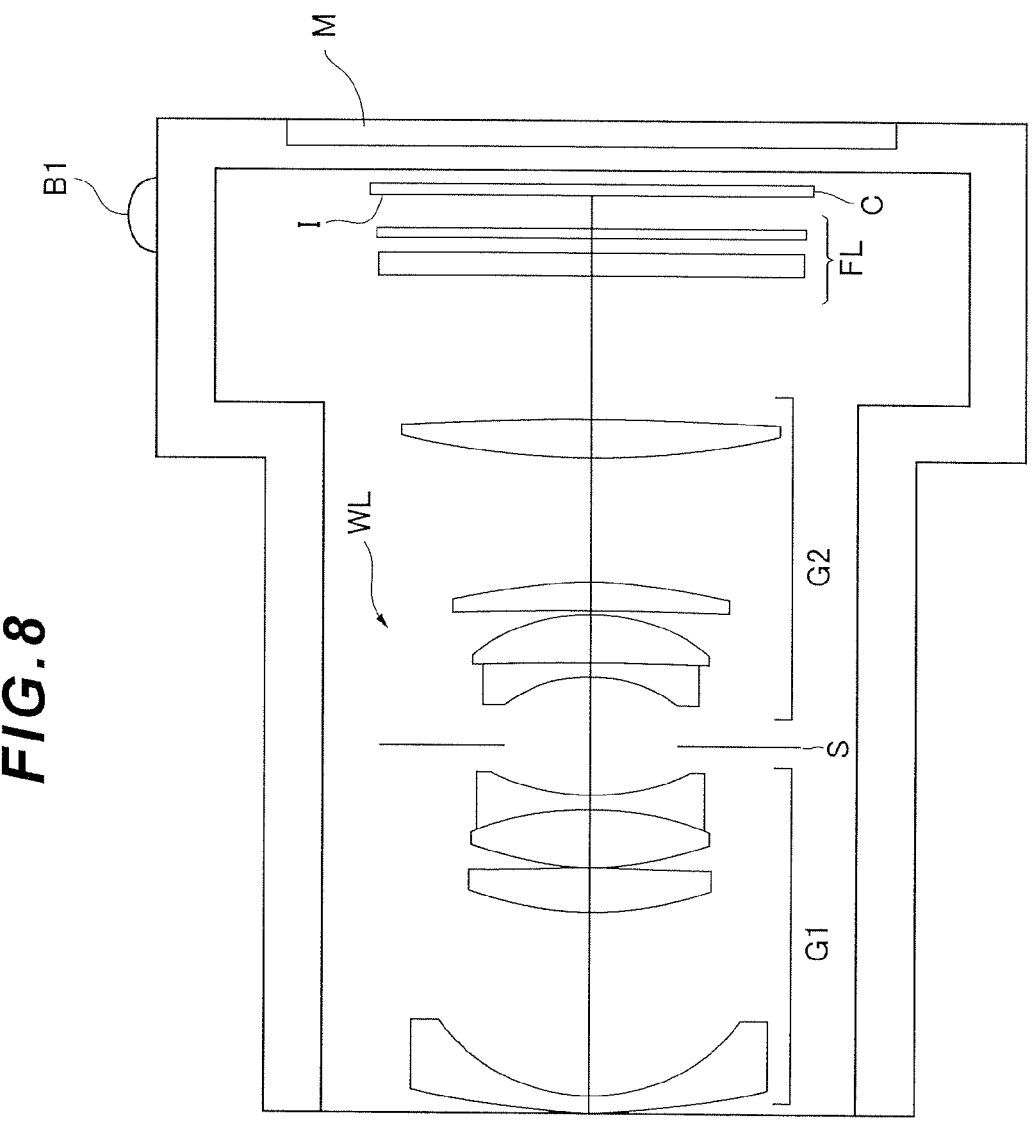

OPTICAL SYSTEM, OPTICAL APPARATUS AND METHOD FOR MANUFACTURING THE OPTICAL SYSTEM

TECHNICAL FIELD

The present invention relates to an optical system having a wide-angle and large aperture, which are suitable for an imaging optical system for a digital camera, a film camera, a video camera or the like.

TECHNICAL BACKGROUND

A wide-angle lens, of which lens barrel can be retracted into the camera when the camera is not used, and which has compactness, a wide-angle of view and high tele-centricity has recently been proposed (e.g. see Patent Document 1).

PRIOR ARTS LIST

Patent Document

Patent Document 1: Japanese Laid-Open Patent Publication No. 2010-101979(A)

SUMMARY OF THE INVENTION

Problems to Re Solved by the Invention

The Fno of a conventional wide-angle lens is about 2.8, but implementing a larger aperture is expected.

With the foregoing in view, it is an object of the present invention to provide an optical system which has compactness, a wide-angle of view, a large aperture, high tele-centricity and high performance, an optical apparatus that includes the optical system, and a method for manufacturing the optical system.

Means to Solve the Problems

To achieve this object, an optical system according to the present invention has: in order from an object, a first lens group having positive refractive power; an aperture stop; and a second lens group, wherein the first lens group includes, in order from the object, a negative lens component, a positive lens component, and a first lens component, the image side surface of which is a concave surface facing the aperture stop, the second lens group includes, in order from the object, a second lens component, the object side surface of which is a concave surface facing the aperture stop, and a positive lens component disposed closest to the image, the first lens component and the second lens component face each other sandwiching the aperture stop, and the following conditional expressions are satisfied. Each of the lens components may be constituted by a single lens or a cemented lens.

$$1.5 < fG1/f < 2.6$$

$$2.1 < TL/f < 3.1$$

where fG1 denotes a focal length of the first lens group, f denotes a focal length of the optical system, and TL denotes a distance, on the optical axis, from the optical surface closest to the object to the optical surface closest to the image in the optical system.

In the optical system according to the present invention, it is preferable that the following conditional expression is satisfied.

$$0.6 < \beta 2R < 0.9$$

where $\beta 2R$ denotes an imaging magnification of the positive lens component that is disposed closest to the image in the second lens group.

In the optical system according to the present invention, it is preferable that the negative lens component constituting the first lens group is a single lens having a negative meniscus shape, the object side surface of which is a convex surface facing the object.

In the optical system according to the present invention, it is preferable that the first lens component constituting the first lens group has negative refractive power.

In the optical system according to the present invention, it is preferable that the second lens group has positive refractive power.

In the optical system according to the present invention, it is preferable that the second lens component constituting the second lens group is a cemented lens of a negative lens disposed closest to the object and a positive lens disposed on the image side thereof, and the following conditional expression is satisfied.

$$|n21 - n22| < 0.016$$

where n21 denotes a refractive index of an optical material of the negative lens constituting the second lens component at the d-line, and n22 denotes a refractive index of an optical material of the positive lens constituting the second lens component at the d-line.

In the optical system according to the present invention, it is preferable that at least one surface of the optical surfaces constituting the second lens group is aspherical.

An optical apparatus according to the present invention has any one of the optical systems described above.

A method for manufacturing an optical system according to the present invention is a method for manufacturing an optical system having, in order from an object, a first lens group having positive refractive power, an aperture stop, and a second lens group, wherein the first lens group includes, in order from the object, a negative lens component, a positive lens component, and a first lens component, the image side surface of which is a concave surface facing the aperture stop, the second lens group includes, in order from the object, a second lens component, the object side surface of which is a concave surface facing the aperture stop, and a positive lens component disposed closest to the image, the first lens component and the second lens component face each other sandwiching the aperture stop, and each lens is assembled in a lens barrel so that the following conditional expressions are satisfied.

$$1.5 < fG1/f < 2.6$$

$$2.1 < TL/f < 3.1$$

where fG1 denotes a focal length of the first lens group, f denotes a focal length of the optical system, and TL denotes a distance on the optical axis, from the optical surface closest to the object to the optical surface closest to the image in the optical system.

Advantageous Effects of the Invention

According to the present invention, an optical system which has compactness, a wide-angle of view, a large aperture, high tele-centricity and high performance, an optical apparatus that includes the optical system, and a method for manufacturing the optical system can be provided.

BRIEF DESCRIPTION OF THE DRAWINGS

FIG. 1 are a set of cross-sectional views depicting a lens configuration of an optical system according to Example 1, where

FIG. 2 are a set of graphs showing various aberrations of the optical system according to Example 1, where

FIG. 3 are a set of cross-sectional views depicting a lens configuration of an optical system according to Example 2, where

FIG. 4 are a set of graphs showing various aberrations of the optical system according to Example 2, where

FIG. 5 are a set of cross-sectional views depicting a lens configuration of an optical system according to Example 3, where

FIG. 6 are a set of graphs showing various aberrations of the optical system according to Example 3, where

FIG. 7 show a digital camera (optical apparatus) including the optical system according to this embodiment, where

FIG. 8 is a cross-sectional view along the line in FIG. 7A; and

DESCRIPTION OF THE EMBODIMENTS

Figure 1A:
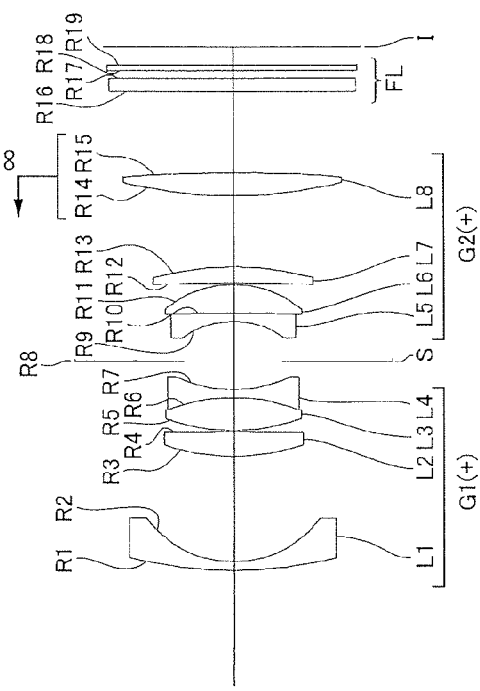
FIG. 1A shows a state of focusing on infinity.
Figure 1B:
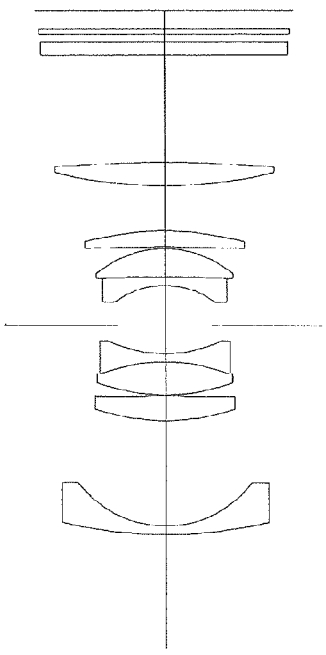
FIG. 1B shows a state when the imaging magnification $\beta=-1/20$.

Embodiments of the present invention will now be described with reference to the drawings. As FIG. 1 show, an optical system WL according to this embodiment has, in order from an object, a first lens group G1 having positive refractive power, an aperture stop S and a second lens group G2, wherein the first lens group G1 includes, in order from the object, a negative lens component L1, a positive lens component L2 and a first lens component, the image side surface of which is a concave surface facing the aperture stop S (corresponds to a cemented lens of the lenses L3 and L4 in FIG. 1), the second lens group G2 includes, in order from the object, a second lens component, the object side surface of which is a concave surface facing the aperture stop S (corresponds to a cemented lens of the lenses L5 and L6 in FIG. 1), and a positive lens component disposed closest to the image (corresponds to a lens L8 in FIG. 1), the first lens component and the second lens component face each other sandwiching the aperture stop S, and the following conditional expressions (1) and (2) are satisfied.

$$1.5 < fG1/f < 2.6 \tag{1}$$

$$2.1 < TL/f < 3.1 \tag{2}$$

where fG1 denotes a focal length of the first lens group G1, f denotes a focal length of the optical system WL, and TL denotes a distance, on the optical axis, from the optical surface closest to the object to the optical surface closest to the image in the optical system WL.

According to the embodiment having this configuration, an optical system, the lens barrel of which can be retracted into the camera when the camera is not used, and which still has compactness, a wide-angle of view (about a 65° angle of view), a large aperture (about a 2.0 Fno), high tele-centricity and high performance can be provided.

The conditional expression (1) specifies the appropriate refractive power of the first lens group G1. By satisfying the conditional expression (1), compactness of the optical system is implemented while ensuring tele-centricity. If the upper limit value of the conditional expression (1) is exceeded, the focal length of the first lens group G1 with respect to the focal length of the optical system WL becomes long, and back focus increases, therefore tele-centricity becomes high but downsizing becomes difficult, which is not desirable. If the lower limit value of the conditional expression (1) is not reached, the focal length of the first lens group G1 with respect to the focal length of the optical system WL becomes short, and back focus decreases, which is advantageous for downsizing, but it becomes difficult to ensure tele-centricity.

To demonstrate the effect of this embodiment with certainty, it is preferable that the upper limit value of the conditional expression (1) is 2.3. It is more preferable that the upper limit value of the conditional expression (1) is 1.85.

The conditional expression (2) specifies the appropriate length of the optical system WL to balance the downsizing of the optical system WL and aberration correction. If the upper limit value of the conditional expression (2) is exceeded, it is advantageous for correcting various aberrations, such as spherical Aberration and astigmatism, but the total length of the optical system WL becomes too long and makes downsizing difficult, which is not desirable. If the lower limit value of the conditional expression (2) is not reached, the total length of the optical system WL becomes short, which is advantageous for downsizing, but it becomes difficult to correct spherical aberration, astigmatism and coma aberration, which is not desirable.

To demonstrate the effect of this embodiment with certainty, it is preferable that the upper limit value of the conditional expression (2) is 3.0. To demonstrate the effect of this embodiment with certainty, it is preferable that the lower limit value of the conditional expression (2) is 2.6.

It is preferable that the optical system WL of this embodiment satisfies the following conditional expression (3).

$$0.6 < \beta 2R < 0.9 \tag{3}$$

where $\beta 2R$ denotes an imaging magnification of the positive lens component that is disposed closest to the image in the second lens group G2.

To retract the lens barrel into the camera when the camera is not used so that the camera becomes compact, it is preferable to perform focusing from an object at infinity to an object at a finite distance by moving the positive lens component disposed closest to the image in the second lens group G2 (corresponds to the lens L8 in FIG. 1) along the optical axis.

The conditional expression (3) specifies the balance of the moving distance and aberration correction of the positive lens component disposed closest to the image in the second lens group G2. If the upper limit value of the conditional expression (3) is exceeded, it is advantageous to correct various aberrations such as curvature of field, but the moving distance of the positive lens component for focusing increases, which is not desirable. If the lower limit value of the conditional expression (3) is not reached, the moving distance of the positive lens component for focusing decreases, which is advantageous for focusing, but the short distance fluctuation of coma aberration increases during focusing, which is not desirable. Correction of curvature of field also becomes difficult.

To demonstrate the effect of this embodiment with certainty, it is preferable that the upper limit value of the conditional expression (3) is 0.85. To demonstrate the effect of this embodiment with certainty, it is preferable that the lower limit value of the conditional expression (3) is 0.75.

In the optical system WL of this embodiment, it is preferable that the negative lens component L1 constituting the first lens group G1 is a single lens having a negative meniscus shape, the object side surface of which is a convex surface facing the object. By this configuration, various aberrations, such as curvature of field, can be corrected satisfactorily.

In the optical system WL of this embodiment, it is preferable that the first lens component, which is located closest to the aperture stop S in the first lens group G1 and of which image side surface is a concave surface facing the aperture stop S (corresponds to the cemented lens of the lens L3 and L4 in FIG. 1), has negative refractive power. By this configuration, distortion and curvature of field can be corrected satisfactorily.

In the optical system WL of this embodiment, it is preferable that the second lens group G2 has positive refractive power. In other words, the optical system WL has, in order from the Object, the first lens group G1 having positive refractive power, the aperture stop S and the second lens group G2 having positive refractive power. By this configuration, aberration in the first lens group G1 with respect to the angle of view (e.g. distortion, curvature of field and lateral chromatic aberration) and spherical aberration in the second lens group G2 can be corrected satisfactorily.

In the optical system WL of this embodiment, it is preferable that the second lens component, which is located closest to the aperture stop S in the second lens group G2 and of which object side surface is a concave surface facing the aperture stop S, is a cemented lens of a negative lens disposed closest to the object (corresponds to lens L5 in FIG. 1) and a positive lens disposed on the image side thereof (corresponds to the lens L6 in FIG. 1), and the following conditional expression (4) is satisfied.

$$|n21-n22|<0.016 \quad (4)$$

where n21 denotes a refractive index of an optical material of the negative lens constituting the second lens component at the d-line (wavelength: 587.6 nm), and n22 denotes a refractive index of an optical material of the positive lens constituting the second lens component at the d-line (wavelength: 587.6 nm).

The conditional expression (4) specifies an appropriate refractive index difference between the negative lens and the positive lens constituting the cemented lens, which is the second lens component. If the conditional expression (4) is satisfied, the refractive index difference within the cemented lens becomes small, hence longitudinal chromatic aberration and lateral chromatic aberration can be corrected satisfactorily, while decreasing the influence of the cemented surface on various aberrations. If the upper limit value of the conditional expression (4) is exceeded, the refractive index difference within the cemented lens increases, and it becomes difficult to correct longitudinal chromatic aberration and lateral chromatic aberration independently.

In the optical system WL of this embodiment, it is preferable that at least one surface of the optical surfaces constituting the second lens group G2 is aspherical. By this configuration, coma aberration and curvature of field can be corrected satisfactorily.

Figure 7A:
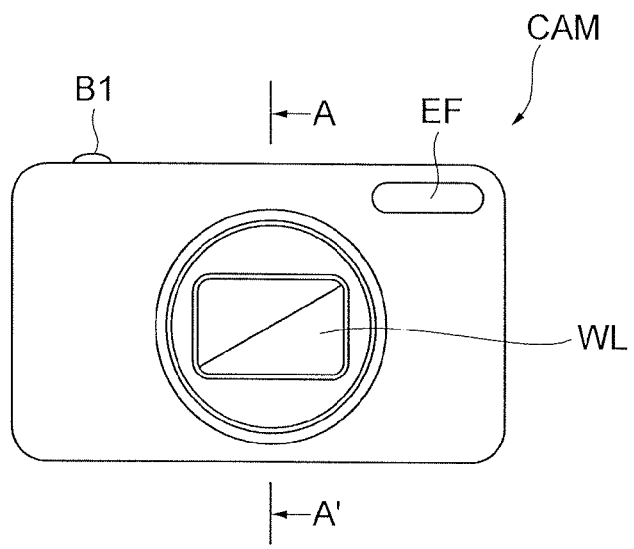
FIG. 7A is a front view and FIG. 7B is a rear view.
Figure 7B:
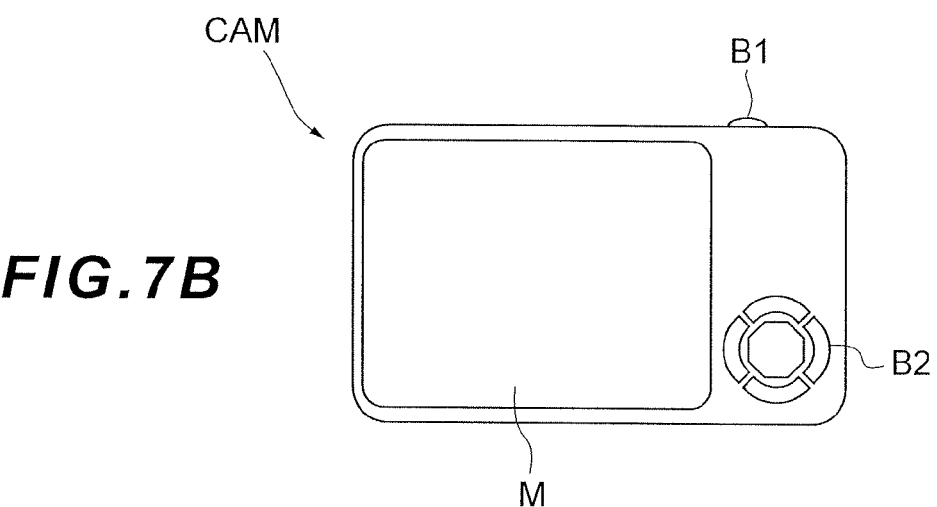

FIG. 7 and FIG. 8 show a configuration of a digital still camera CAM (optical apparatus) as an optical apparatus including this optical system WL. In the digital still camera CAM, if a power button (not illustrated) is pressed, a shutter (not illustrated) of an image capturing lens (optical system WL) is opened, and light from an object is collected by the optical system WL, and forms an image on a picture element C (e.g. CCD, CMOS) disposed on the image plane I (see FIG. 1). The object image formed on the picture element C is displayed on a liquid crystal monitor M disposed on the rear face of the digital still camera CAM. The user determines a composition of the object image while viewing the liquid crystal monitor M, then presses a release button B1 to photograph the object image using the picture element C, and records and stores the image in a memory (not illustrated).

In the camera CAM, an auxiliary light emitting unit EF that emits auxiliary light when the object appears dark, a function button 82 that is used to set various conditions of the digital still camera CAM, are disposed. Here a compact type camera, where the camera CAM and the optical system WL are integrated, is shown as an example, but the present invention may be applied to a single lens reflex camera where the lens barrel including the optical system WL and the camera body are detachable.

According to the camera CAM having the above configuration, the optical system WL according to this embodiment is included as the image capturing lens, thereby a camera, the lens barrel of which can be retracted into the camera when the camera is not used but which still has compactness, wide-angle of view, large aperture, high tele-centricity and high performance can be implemented.

Figure 9:
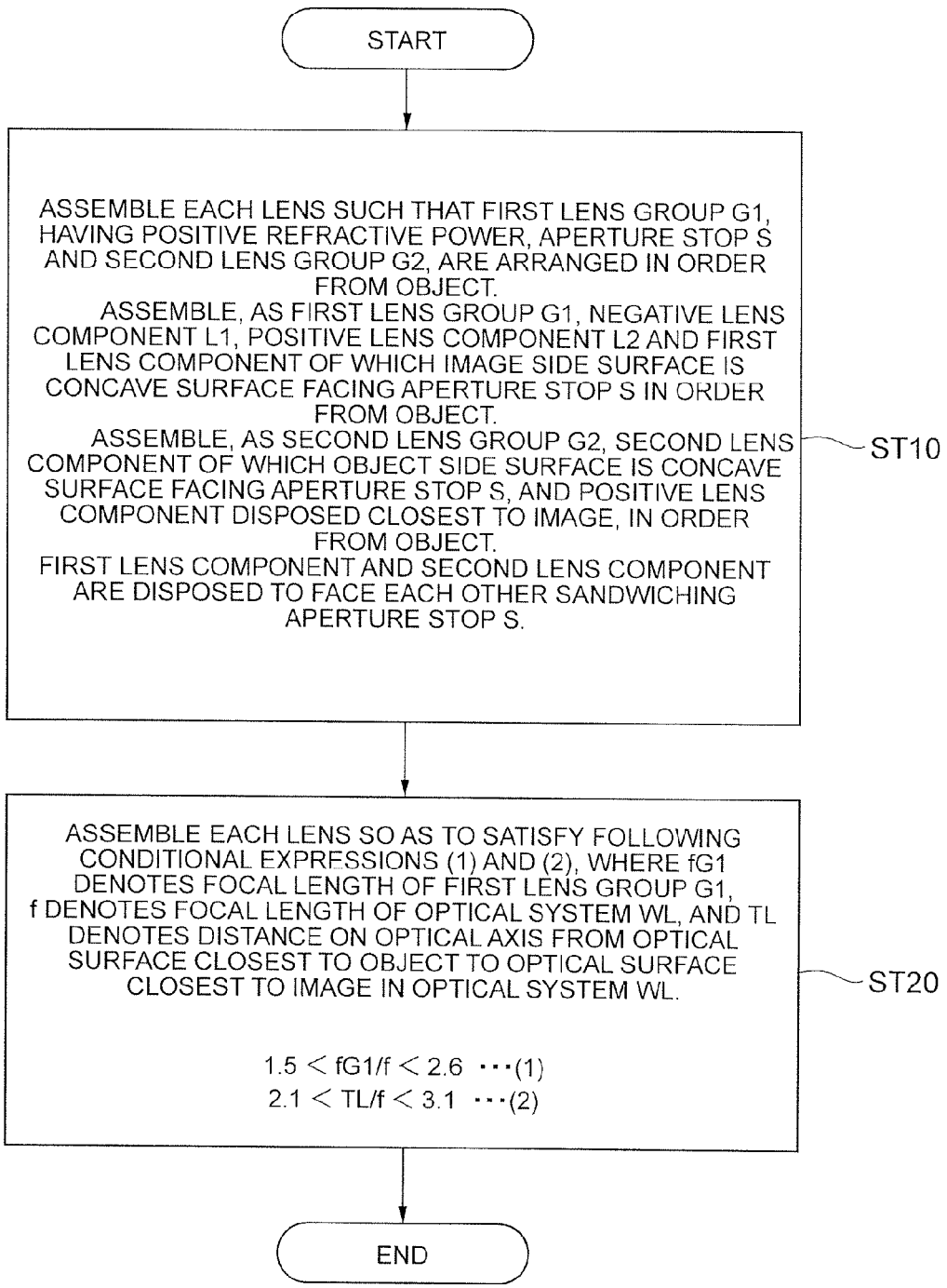
FIG. 9 is a flow chart depicting a method for manufacturing the optical system according to this embodiment.

Now a method for manufacturing the optical system WL will be described with reference to FIG. 9. First the first lens group G1 having positive refractive power, the aperture stop S and the second lens group G2 are assembled in the lens barrel in order from the object (step ST10). In this step, the first lens group G1 is assembled so that the negative lens component L1, the positive lens component L2 and the first lens component, the image side surface of which is a concave surface facing the aperture stop S, are arranged in order from the object. The second lens group G2 is assembled so that the second lens component, the object side surface of which is a concave surface facing the aperture stop S, and the positive lens component disposed closest to the image are arranged in order from the object. Then the first lens component and the second lens component are disposed to face each other, sandwiching the aperture stop S. Each lens is then assembled in the lens barrel so that expressions (1) and (2) are satisfied (step ST 20).

$$1.5<fG1/f<2.6 \quad (1)$$

$$2.1<TL/f<3.1 \quad (2)$$

where fG1 denotes a focal length of the first lens group G1, f denotes a focal length of the optical system WL, and TL denotes a distance, on the optical axis, from the optical surface closest to the object to the optical surface closest to the image in the optical system WL.

FIG. 1 show an example of the lens configuration according to this embodiment. In the optical system WL, the first lens group G1, which includes, in order from the object, a negative meniscus lens L1 having a convex surface facing the object, a biconvex positive lens L2, and a cemented lens of a biconvex positive lens L3 and a biconcave negative lens L4, is assembled and is disposed on the object side of the aperture stop S, such that the first lens group G1 as a whole has positive refractive power. The second lens group G2, which includes, in order from the object, a cemented lens of a negative meniscus lens L5 having a concave surface facing the object and a positive meniscus lens L6 having a convex surface facing the image, a positive meniscus lens L7 having a convex surface facing the image, and a biconvex positive lens L8, is assembled and is disposed on the image side of the aperture stop S, such that the second lens group G2 as a whole has positive refractive power. Each lens is assembled such that the value corresponding to the conditional expression (1) is 1.6001, and the value corresponding to the conditional expression (2) is 2.7148.

According to the method for manufacturing the optical system WL, an optical system which has compactness, a wide-angle of view, a large aperture, high tele-centricity and high performance can be acquired.

EXAMPLES

Each example of this embodiment will now be described with reference to the drawings. Table 1 to Table 3 shown below list each data of Example 1 to Example 3.

In each example, the aberration characteristics are calculated with respect to the C-line (wavelength: 656.2730 nm), the d-line (wavelength: 587.5620 nm), the F-line (wavelength: 486.1330 nm) and the g-line (wavelength: 435.8350 nm).

In [Lens Data] in each table, the surface number is the sequential number of the optical surface counted from the object side in the light traveling direction, R denotes the radius of curvature of each optical surface, D denotes a distance from each optical surface to the next optical surface (or image plane) on the optical axis, nd denotes a refractive index of the material of the optical member at the d-line, and vd denotes an Abbe number of the material of the optical member with respect to the d-line. An object surface indicates the surface of the object, (Variable) indicates a variable surface distance, "∞" in the radius of curvature indicates a plane or an aperture, (Stop S) indicates an aperture stop S, and Image Plane indicates an image plane I. The refractive index of air "1.0000" is omitted. If the optical surface is aspherical, * is attached to the surface number and paraxial radius of curvature is shown in the column of the radius of curvature R.

In [Aspherical Data] in each table, a form of the aspherical surface in [Lens Data] is indicated by the following expression (a). Here X(y) denotes a distance in the optical axis direction from a tangential plane at a vertex of the aspherical surface to a position on the aspherical surface at height y, r denotes a radius of curvature (paraxial radius of curvature) of the reference spherical surface, K denotes a conical coefficient, Ai denotes an aspherical coefficient of the i-th order, and "E-n" indicates "×10$^{-n}$". For example, 1.234E-05=1.234×10$^{-5}$.

$$X(y)=(y^2/r)/\{1+(1-\kappa\times y^2/r^2)^{1/2}\}+A4\times y^4+A6\times y^6+A8\times y^8+A10\times y^{10}$$ (a)

In [Various Data] in each table, f denotes a focal length of the optical system, FNO denotes an F number, Ω denotes a half angle of view (maximum incident angle, unit: °), Y denotes an image height, TL denotes a total length of the optical system, BF denotes a distance from an image side surface of an optical member disposed closest to the image to a paraxial image plane, and BF (air conversion) denotes a distance from the last optical surface to the paraxial image plane converted into air.

In [Variable Distance Data] in each table, a variable distance Di in the state of focusing on infinity (imaging magnification β=0.00) and the state of imaging magnification β=−1/20 are shown respectively. Di denotes a variable distance between the i-th surface and the (i+1)-th surface.

In [Lens Group Data] in each table, G denotes a group number, "First surface of group" indicates a surface number of the surface closest to the Object in each group, and "Group focal length" indicates a focal length of each group.

In [Conditional Expression] in each table, a value corresponding to each conditional expressions (1) to (4) is shown.

In all the data values hereinbelow, unless specifically indicated, "mm" is normally used as the unit of focal length f, radius of curvature R, surface distance D and other lengths, but the unit is not limited to "mm", and another appropriate unit may be used, since equivalent optical performance is obtained even if the optical system is proportionally expanded or proportionally reduced.

This description on a table is the same for all the examples, and is therefore omitted hereinbelow.

Example 1

Example 1 will be described with reference to FIG. 1, FIG. 2 and Table 1. As FIG. 1 shows, an optical system WL (WL1) according to Example 1 includes, in order from an object, a first lens group G1 having positive refractive power, an aperture stop S, a second lens group G2 having positive refractive power, and a filter group FL.

The first lens group G1 includes, in order from the object, a negative meniscus lens L1 having a convex surface facing the object, a biconvex positive lens L2, a cemented lens of a biconvex positive lens L3 and a biconcave negative lens L4.

The second lens group G2 includes, in order from the object, a cemented lens of a negative meniscus lens L5 having a concave surface facing the object and a positive meniscus lens L6 having a convex surface facing the image, a positive meniscus lens L7 having a convex surface facing the image, and a biconvex positive lens L8. The image side lens surface of the positive meniscus lens L7 is aspherical.

The filter group FL is constituted by a low-pass filter, an infrared cut-off filter or the like to cut off spatial frequencies exceeding a critical resolution of a solid-state picture element (e.g. CCD, CMOS) disposed on the image plane I.

In the optical system WL1 according to this example, it is preferable that focusing from an object at infinity to an object at a finite distance with the imaging magnification β=−1/20 or so is performed by moving the biconvex positive lens L8, which is disposed closest to the image in the second lens group G2, along the optical axis.

Table 1 shows each data value of Example 1. The surface numbers 1 to 19 in Table 1 correspond to each optical surface having the radius of curvature R1 to R19 shown in FIG. 1 respectively. In Example 1, surface 13 is aspherical.

TABLE 1

[Lens Data]

| Surface number | R | D | nd | vd |
|---|---|---|---|---|
| Object surface | ∞ | | | |
| 1 | 2.44963 | 0.04352 | 1.5168 | 64.12 |
| 2 | 0.58892 | 0.56579 | | |
| 3 | 1.15776 | 0.13057 | 1.8160 | 46.63 |
| 4 | −23.93710 | 0.00870 | | |
| 5 | 1.11120 | 0.17409 | 1.8160 | 46.63 |
| 6 | −0.98386 | 0.04352 | 1.6034 | 38.02 |
| 7 | 0.72683 | 0.15233 | | |
| 8 (stop S) | ∞ | 0.21326 | | |
| 9 | −0.45306 | 0.04352 | 1.7283 | 28.46 |
| 10 | −8.79337 | 0.15233 | 1.7130 | 53.89 |
| 11 | −0.58572 | 0.00870 | | |
| 12 | −10.99350 | 0.08705 | 1.6935 | 53.31 |
| *13 (aspherical) | −1.42342 | D13 (variable) | | |
| 14 | 2.61136 | 0.12186 | 1.5168 | 64.12 |
| 15 | −7.82505 | D15 (variable) | | |
| 16 | ∞ | 0.06920 | 1.5168 | 64.20 |
| 17 | ∞ | 0.04352 | | |
| 18 | ∞ | 0.03047 | 1.5168 | 64.20 |
| 19 | ∞ | BF | | |
| Image plane | ∞ | | | |

[Aspherical Data]

Surface 13
κ = −13.767, A4 = −3.58049E−01, A6 = 1.89486E+00,
A8 = −1.61600E+00, A10 = 0.00000E+00

[Variable Data]

| f | 1.00 |
|---|---|
| FNO | 2.08 |
| ω | 32.78 |
| Y | 0.63 |
| TL | 2.71 |
| BF | 0.097 |
| BF (air conversion) | 0.73 |

[Variable Distance Data]

| | Infinity | β = −1/20 |
|---|---|---|
| D13 | 0.37924 | 0.24167 |
| D15 | 0.43221 | 0.56978 |
| BF | 0.09749 | 0.09749 |

[Lens Group Data]

| Group number | First surface of group | Group focal length |
|---|---|---|
| G1 | 1 | 1.60013 |
| G2 | 9 | 1.57647 |

[Conditional Expressions]

Conditional expression (1) fG1/f = 1.6001
Conditional expression (2) TL/f = 2.7148
Conditional expression (3) β2R = 0.8161
Conditional expression (4) |n21−n22| = 0.0153

As Table 1 shows, the optical system WL1 according to this example satisfies the conditional expressions (1) to (4).

Figure 2A:
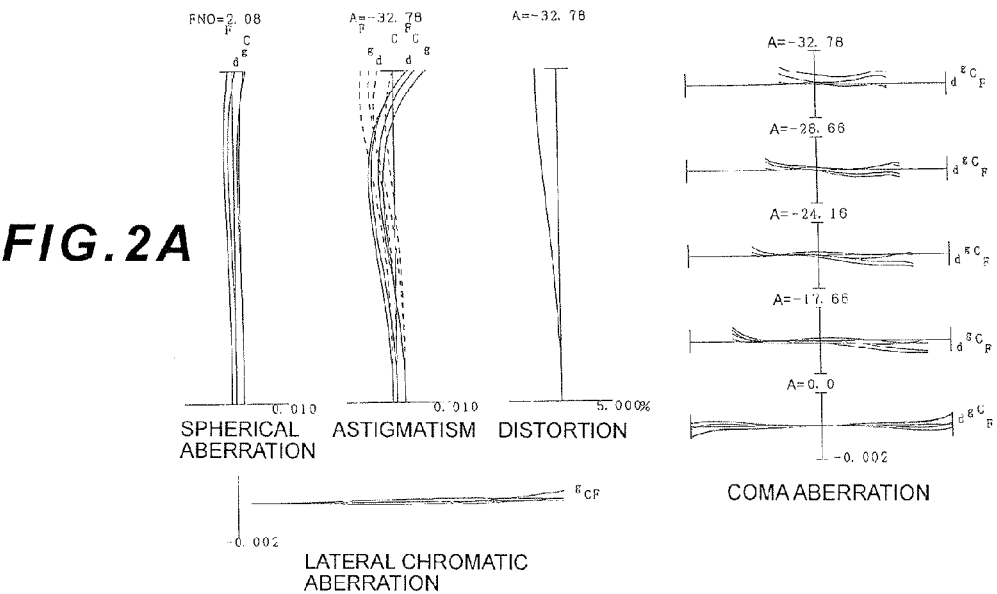
FIG. 2A is a set of graphs showing various aberrations of the optical system upon focusing on infinity.
Figure 2B:
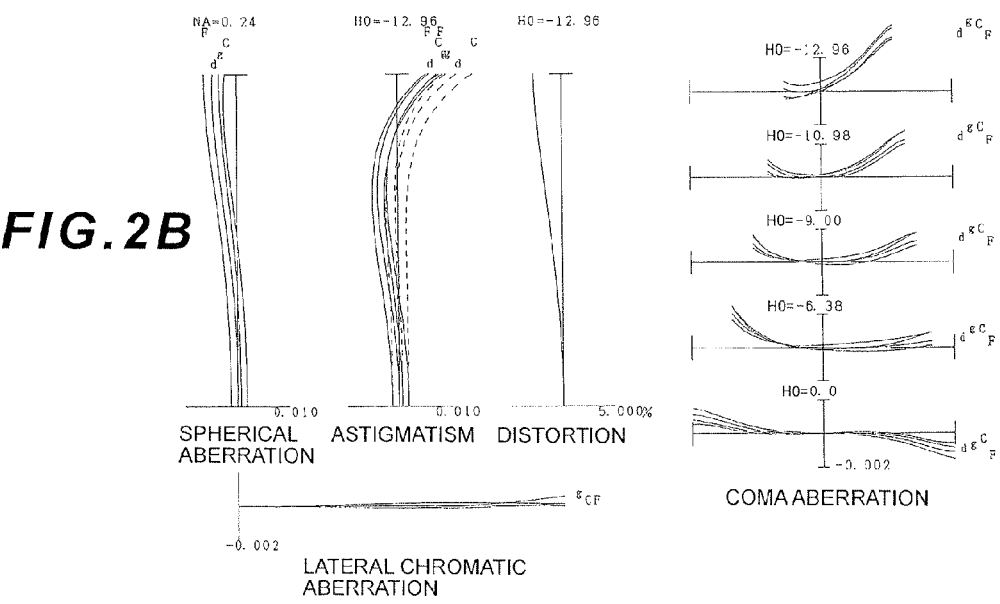
FIG. 2B is a set of graphs showing various aberrations when the imaging magnification is $\beta=-1/20$.

FIG. 2 are a set of graphs showing various aberrations (spherical aberration, astigmatism, distortion, coma aberration and lateral chromatic aberration) of the optical system WL1 according to Example 1, where FIG. 2A is a set of graphs showing various Aberrations upon focusing on infinity (imaging magnification β=0.00), and FIG. 2B is a set of graphs showing various aberrations in the state of the imaging magnification β=−1/20.

In each graph showing aberrations, FNO denotes an F number, NA denotes a numerical aperture, A denotes a half angle of view (unit: °) with respect to each image height, and HO denotes an object height. d denotes an aberration at the d-line, g at the g-line, C at the C-line, and F at the F-line respectively. If d, g, C or F are not indicated, this means that aberration is at the d-line. In the graph showing astigmatism, the solid line indicates the sagittal image surface, and the broken line indicates the meridional image surface.

The description on the graph showing aberrations is the same as for other examples, where this description is omitted.

As each graph showing aberrations clarifies, in Example 1, various aberrations are satisfactorily corrected, demonstrating excellent optical performance.

Example 2

Figure 3A:
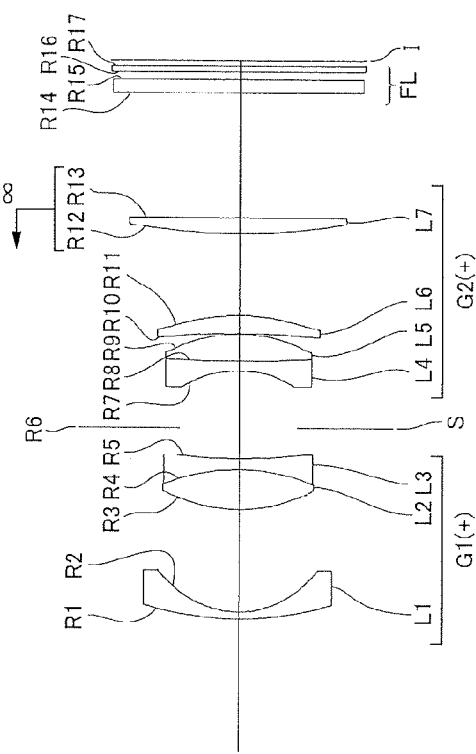
FIG. 3A shows a state of focusing on infinity.
Figure 3B:
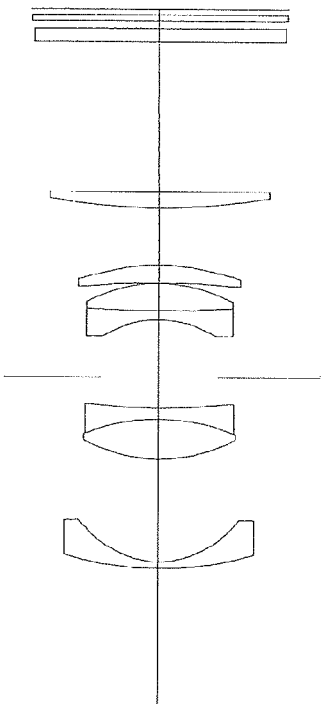
FIG. 3B shows a state when the imaging magnification $\beta=-1/20$.

Example 2 will be described with reference to FIG. 3, FIG. 4 and Table 2. As FIG. 3 show, an optical system WL (WL2) according to Example 2 includes, in order from an object, a first lens group G1 having positive refractive power, an aperture stop S, a second lens group G2 having positive refractive power, and a filter group FL.

The first lens group G1 includes, in order from the object, a negative meniscus lens L1 having a convex surface facing the object, and a cemented lens of a biconvex positive lens L2 and a biconcave negative lens L3. The image side lens surface of the negative meniscus lens L1 is aspherical.

The second lens group G2 includes, in order from the object, a cemented lens of a biconcave negative lens L4 and a biconvex positive lens L5, a positive meniscus lens L6 having a convex surface facing the image and a biconvex positive lens L7. The image side lens surface of the positive meniscus lens L6 is aspherical.

The filter group FL is constituted by a low-pass filter, an infrared cut-off filter or the like to cut off spatial frequencies exceeding a critical resolution of a solid-state picture element (e.g. CCD, CMOS) disposed on the image plane I.

In the optical system WL2 according to this example, it is preferable that focusing from an object at infinity to an object at a finite distance with the imaging magnification β=−1/20 or so is performed by moving the biconvex positive lens L7, which is disposed closest to the image in the second lens group G2, along the optical axis.

Table 2 shows each data value of Example 2. The surface numbers 1 to 17 in Table 2 correspond to each optical surface having the radius of curvature R1 to R17 shown in FIG. 3. In Example 2, surface 2 and surface 11 are aspherical.

TABLE 2

[Lens Data]

| Surface number | R | D | nd | vd |
|---|---|---|---|---|
| Object surface | ∞ | | | |
| 1 | 1.92781 | 0.03505 | 1.5891 | 61.18 |
| *2 (aspherical) | 0.51359 | 0.55021 | | |
| 3 | 0.89544 | 0.21469 | 1.8160 | 46.62 |
| 4 | −1.10698 | 0.05915 | 1.5814 | 40.98 |
| 5 | 3.28604 | 0.16649 | | |
| 6 (stop S) | ∞ | 0.30689 | | |
| 7 | −0.58130 | 0.05039 | 1.8052 | 25.45 |

TABLE 2-continued

| | | | | |
|---|---|---|---|---|
| 8 | 6.64190 | 0.14459 | 1.8160 | 46.62 |
| 9 | −0.85816 | 0.00438 | | |
| 10 | −4.65103 | 0.09639 | 1.7725 | 49.62 |
| *11 (aspherical) | −1.11529 | D11 (variable) | | |
| 12 | 3.50511 | 0.08763 | 1.7550 | 52.32 |
| 13 | −68.47650 | D13 (variable) | | |
| 14 | ∞ | 0.06966 | 1.5168 | 64.20 |
| 15 | ∞ | 0.04381 | | |
| 16 | ∞ | 0.03067 | 1.5168 | 64.20 |
| 17 | ∞ | BF | | |
| Image plane | ∞ | | | |

[Aspherical Data]

Surface 2
$\kappa$ = 0.6856, A4 = 4.91075E−02, A6 = 4.93583E−04,
A8 = 1.12870E+00, A10 = 0.00000E+00
Surface 11
$\kappa$ = −1.1035, A4 = 8.72058E−02, A6 = 3.93067E−01,
A8 = 8.22753E−01, A10 = 0.00000E+00

[Various Data]

| | |
|---|---|
| f | 1.00 |
| FNO | 2.07 |
| ω | 32.97 |
| Y | 0.64 |
| TL | 2.92 |
| BF | 0.031 |
| BF (air conversion) | 0.90 |

[Variable Distance Data]

| | Infinity | $\beta$ = −1/20 |
|---|---|---|
| D13 | 0.43967 | 0.30645 |
| D15 | 0.67088 | 0.80411 |
| BF | 0.03067 | 0.03067 |

[Lens Group Data]

| Group number | First surface of group | Group focal length |
|---|---|---|
| G1 | 1 | 1.84043 |
| G2 | 7 | 1.73724 |

[Conditional Expressions]

Conditional expression (1) fG1/f = 1.8404
Conditional expression (2) TL/f = 2.9183
Conditional expression (3) $\beta$2R = 0.8056
Conditional expression (4) |n21−n22| = 0.0108

As Table 2 shows, the optical system WL2 according to this example satisfies the conditional expressions (1) to (4).

Figure 4A:
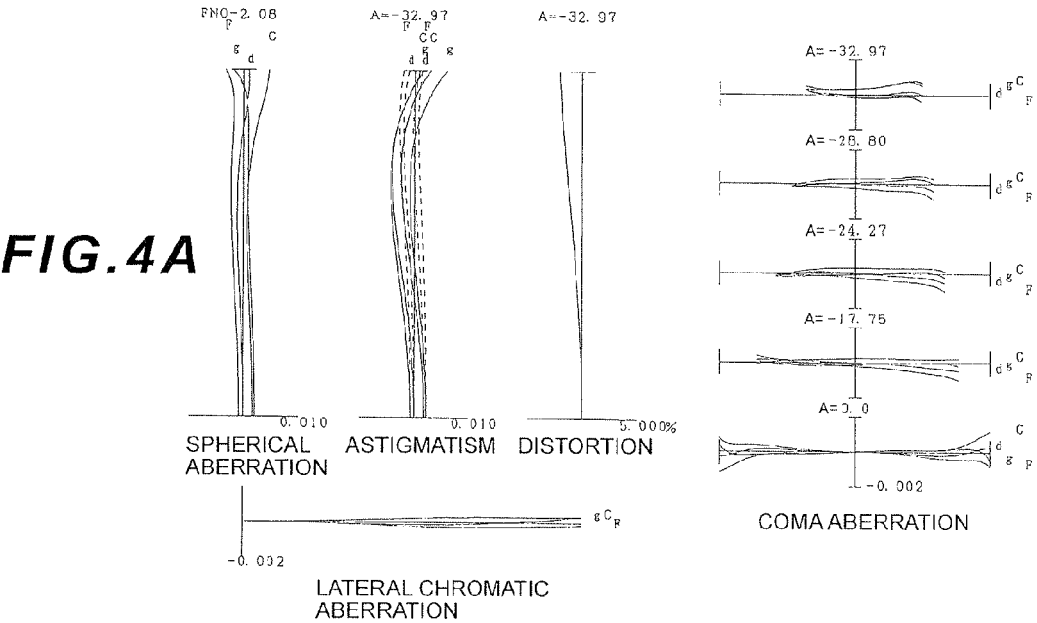
FIG. 4A is a set of graphs showing various aberrations of the optical system upon focusing on infinity.
Figure 4B:
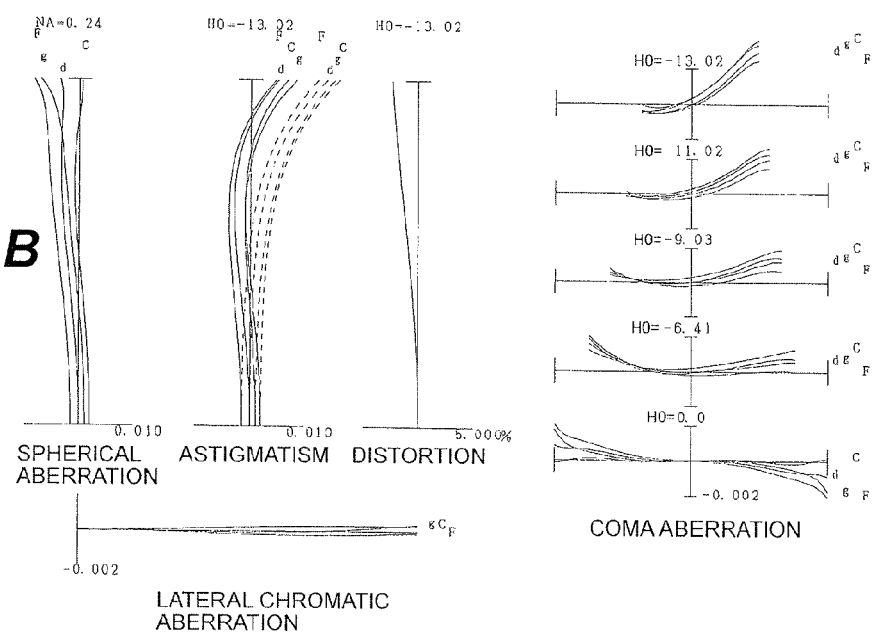
FIG. 4B is a set of graphs showing various aberrations when the imaging magnification is $\beta=-1/20$.

FIG. 4 are a set of graphs showing various aberrations (spherical aberration, astigmatism, distortion, coma aberration and lateral chromatic aberration) of the optical system WL2 according to Example 2, where FIG. 4A is a set of graphs showing various aberrations upon focusing on infinity (imaging magnification $\beta$=0.00), and FIG. 4B is a set of graphs showing various aberrations in the state of the imaging magnification $\beta$=−1/20.

As each graph showing aberrations clarifies, in Example 2, various aberrations are satisfactorily corrected, demonstrating excellent optical performance.

Example 3

Figure 5A:
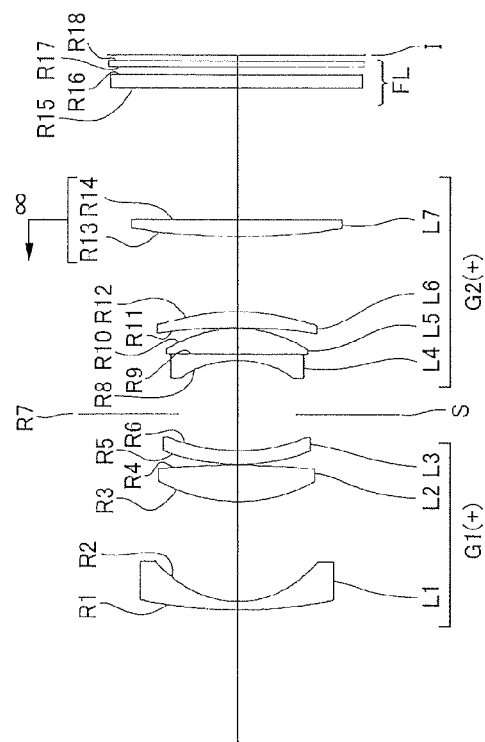
FIG. 5A shows a state of focusing on infinity.
Figure 5B:
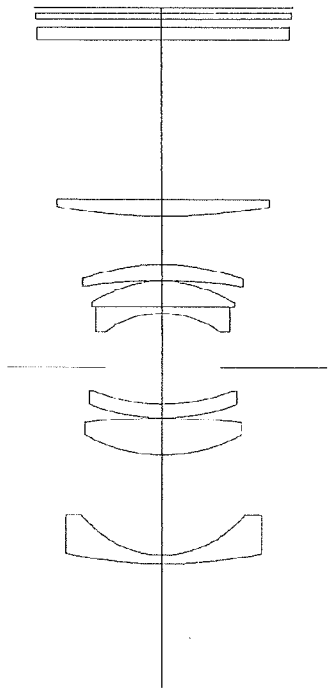
FIG. 5B shows a state when the imaging magnification $\beta=-1/20$.

Example 3 will be described with reference to FIG. 5, FIG. 6 and Table 3. As FIG. 5 show, an optical system WL (WL3) according to Example 3 includes, in order from an object, a first lens group G1 having positive refractive power, an aperture stop S, a second lens group G2 having positive refractive power, and a filter group FL.

The first lens group G1 includes, in order from the object, a negative meniscus lens L1 having a convex surface facing the object, a biconvex positive lens L2, and a negative meniscus lens L3 having a convex surface facing the object. The object side and image side lens surfaces of the negative meniscus lens L1 are aspherical.

The second lens group G2 includes, in order form the object, a cemented lens of a negative meniscus lens L4 having a concave surface facing the object and a positive meniscus lens L5 having a convex surface facing the image, a positive meniscus lens L6 having a convex surface facing the image, and a positive meniscus lens L7 having a convex surface facing the object. The image side lens surface of the positive meniscus lens L6 is aspherical.

The filter group FL is constituted by a low-pass filter, an infrared cut-off filter or the like to cut off spatial frequencies exceeding a critical resolution of a solid-state picture element (e.g. CCD, CMOS) disposed on the image plane I.

In the optical system WL3 according to this example, it is preferable that focusing from an object at infinity to an object at a finite distance with the imaging magnification $\beta$=−1/20 or so is performed by moving the biconvex positive lens L7, which is disposed closest to the image in the second lens group G2, along the optical axis.

Table 3 shows each data value of Example 3. The surface numbers 1 to 18 in Table 3 correspond to each optical surface having the radius of curvature R1 to R18 shown in FIG. 5 respectively. In Example 3, surface 1, surface 2 and surface 12 are aspherical.

TABLE 3

[Lens Data]

| Surface number | R | D | nd | vd |
|---|---|---|---|---|
| Object surface | ∞ | | | |
| *1 (aspherical) | 2.4622 | 0.0435 | 1.58913 | 61.18 |
| *2 (aspherical) | 0.5160 | 0.5357 | | |
| 3 | 0.8814 | 0.1957 | 1.77250 | 49.60 |
| 4 | −4.0282 | 0.0043 | | |
| 5 | 1.1956 | 0.0696 | 1.80810 | 22.76 |
| 6 | 1.0179 | 0.1913 | | |
| 7 (stop S) | ∞ | 0.2913 | | |
| 8 | −0.5339 | 0.0348 | 1.84666 | 23.80 |
| 9 | −38.5119 | 0.1348 | 1.83481 | 42.73 |
| 10 | −0.7044 | 0.0043 | | |
| 11 | −3.0029 | 0.0870 | 1.83481 | 42.73 |
| *12 (aspherical) | −1.1129 | D12 (variable) | | |
| 13 | 3.4782 | 0.0870 | 1.75450 | 52.32 |
| 14 | 86.9562 | D14 (variable) | | |
| 15 | ∞ | 0.0691 | 1.51680 | 64.20 |
| 16 | ∞ | 0.0435 | | |
| 17 | ∞ | 0.0304 | 1.51680 | 64.20 |
| 18 | ∞ | BF | | |
| Image plane | ∞ | | | |

[Aspherical Data]

Surface 1
$\kappa$ = −0.0919, A4 = −6.92790E−02, A6 = 0.00000E+00,
A8 = 0.00000E+00, A10 = 0.00000E+00
Surface 2
$\kappa$ = 0.4555, A4 = 1.51191E−01, A6 = 3.57304E−01,
A8 = 0.00000E+00, A10 = 0.00000E+00

TABLE 3-continued

Surface 11
κ = −5.9869, A4 = −3.53602E−01, A6 = 1.32700E+00,
A8 = 0.00000E+00, A10 = 0.00000E+00

[Various Data]

| f | 1.00 |
|---|---|
| FNO | 2.07 |
| ω | 32.97 |
| Y | 0.63 |
| TL | 2.86 |
| BF | 0.031 |
| BF (air conversion) | 0.93 |

[Variable Distance Data]

| | Infinity | β = −1/20 |
|---|---|---|
| D12 | 0.39689 | 0.25791 |
| D14 | 0.69734 | 0.83633 |
| BF | 0.03070 | 0.03070 |

[Lens Group Data]

| Group number | First surface of group | Group focal length |
|---|---|---|
| G1 | 1 | 1.81297 |
| G2 | 8 | 1.78301 |

[Conditional Expressions]

Conditional expression (1) fG1/f = 1.8130
Conditional expression (2) TL/f = 2.8640
Conditional expression (3) β2R = 0.8148
Conditional expression (4) |n21-n22| = 0.0119

As Table 3 shows, the optical system WL3 according to this example satisfies the conditional expressions (1) to (4).

Figure 6A:
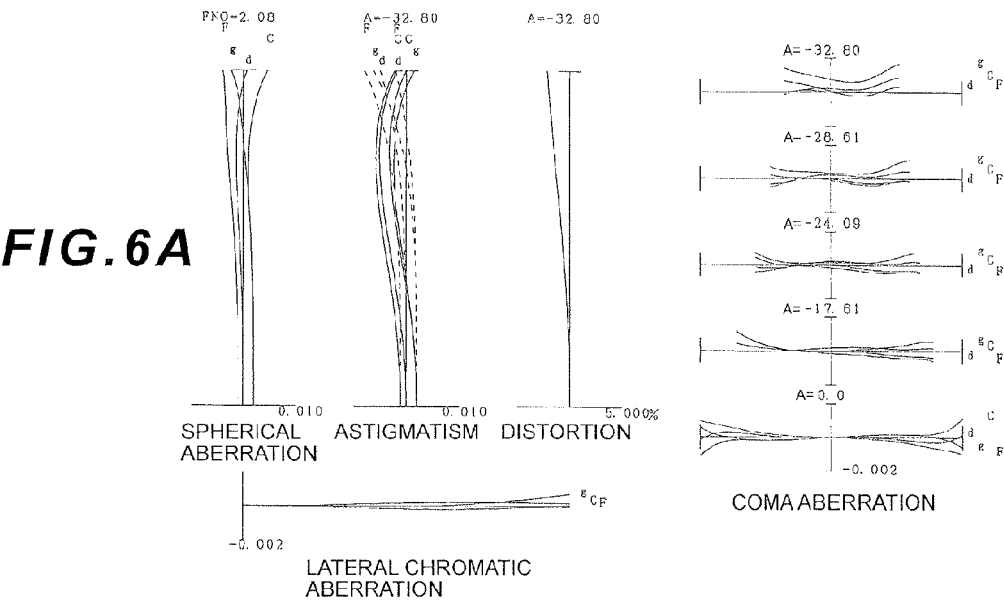
FIG. 6A is a set of graphs showing various aberrations of the optical system upon focusing on infinity.
Figure 6B:
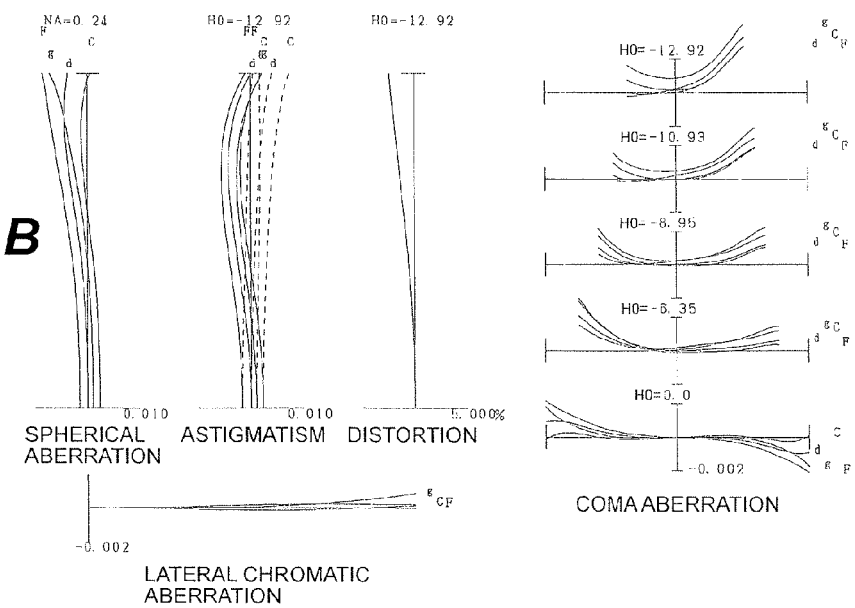
FIG. 6B is a set of graphs showing various Aberrations when the imaging magnification is $\beta=-1/20$.

FIG. 6 are a set of graphs showing various aberrations (spherical aberration, astigmatism, distortion, coma aberration and lateral chromatic aberration) of the optical system WL3 according to Example 3, where FIG. 6A is a set of graphs showing various aberrations upon focusing on infinity (imaging magnification β=0.00), and FIG. 6B is a set of graphs showing various aberrations in the state of the imaging magnification β=−1/20.

As each graph showing aberrations clarifies, in Example 3, various aberrations are satisfactorily corrected, demonstrating excellent optical performance.

According to each example described above, an optical system, the lens barrel of which can be retracted into the camera when the camera is not used but which still has compactness, about a 65° angle of view, about a 2.0 Fno and high tele-centricity can be implemented.

The invention has been described with the configuration requirements of the embodiments, but needless to say, the present invention is not limited to this description.

EXPLANATION OF NUMERALS AND CHARACTERS

W1 (WL1 to WL3) optical system
CAM digital still camera (optical apparatus)
G1 first lens group
G2 second lens group
S aperture stop
FL filter group
I image plane

The invention claimed is:

1. An optical system comprising, in order from an object:
a first lens group having positive refractive power;
an aperture stop; and
a second lens group,
the first lens group including, in order from the object, a negative lens component, a positive lens component, and a first lens component, the image side surface of the first lens component being a concave surface facing the aperture stop and being a closest surface of the first lens group to the aperture stop,
the second lens group including, in order from the object, a second lens component, and a positive lens component disposed closest to the image, the object side surface of the second lens component being a concave surface facing the aperture stop and being a closest surface of the second lens group to the aperture stop, and
the following conditional expressions being satisfied:

$1.5 < fG1/f < 2.6$ $2.1 < TL/f < 3.1$ $0.6 < \beta 2R < 0.9$ where
fG1 denotes a focal length of the first lens group,
f denotes a focal length of the optical system,
TL denotes a distance, on the optical axis, from the optical surface closest to the object to the optical surface closest to the image in the optical system, and
β2R denotes an imaging magnification of the positive lens component that is disposed closest to the image in the second lens group.

2. The optical system according to claim 1, wherein the negative lens component of the first lens group is a single lens having a negative meniscus shape, the object side surface of which is a convex surface facing the object.

3. The optical system according to claim 1, wherein the first lens component of the first lens group has negative refractive power.

4. The optical system according to claim 1, wherein the second lens group has positive refractive power.

5. The optical system according to claim 1, wherein the second lens component of the second lens group is a cemented lens of a negative lens disposed closest to the object and a positive lens disposed on the image side thereof, and
the following conditional expression is satisfied:

$|n21-n22| < 0.016$ where
n21 denotes a refractive index of an optical material of the negative lens of the second lens component at the d-line, and
n22 denotes a refractive index of an optical material of the positive lens of the second lens component at the d-line.

6. The optical system according to claim 1, wherein at least one surface of the optical surfaces constituting the second lens group is aspherical.

7. An optical apparatus comprising the optical system according to claim 1.

8. A method for manufacturing an optical system including, in order from an object, a first lens group having positive refractive power, an aperture stop, and a second lens group, the method comprising:
assembling the first lens group, the aperture stop, and the second lens group in a lens barrel, the first lens group including, in order from the object, a negative lens component, a positive lens component, and a first lens component, the image side surface of the first lens group being a concave surface facing the aperture stop and being a closest surface of the first lens group to the aperture stop, the second lens group including, in order from the object, a second lens component, and a positive lens component disposed closest to the image, the object side surface of the second lens component being a concave surface facing the aperture stop and being a closest surface of the second lens group to the aperture stop, and satisfying the following conditional expressions:

$$1.5 < fG1/f < 2.6$$

$$2.1 < TL/f < 3.1$$

$$0.6 \beta 2R < 0.9$$

where fG1 denotes a focal length of the first lens group, f denotes a focal length of the optical system, TL denotes a distance on the optical axis, from the optical surface closest to the object to the optical surface closest to the image in the optical system, and β2R denotes an imaging magnification of the positive lens component that is disposed closest to the image in the second lens group.

\* \* \* \* \*